United States Patent
Caine et al.

(10) Patent No.: US 9,476,724 B2
(45) Date of Patent: *Oct. 25, 2016

(54) INTELLIGENT ROUTE NAVIGATION

(71) Applicant: INTERNATIONAL BUSINESS MACHINES CORPORATION, Armonk, NY (US)

(72) Inventors: Horatio Caine, Winchester (GB); Daniel S. Houston, Winchester (GB); Mihail S. Krastev, Winchester (GB); Robert A. Wallis, Winchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/131,344

(22) Filed: Apr. 18, 2016

(65) Prior Publication Data
US 2016/0258769 A1 Sep. 8, 2016

Related U.S. Application Data

(63) Continuation of application No. 14/046,070, filed on Oct. 4, 2013, now Pat. No. 9,347,780.

(30) Foreign Application Priority Data

Oct. 5, 2012 (GB) .................................. 1217854.7

(51) Int. Cl.
G01C 21/32 (2006.01)
G01C 21/34 (2006.01)
G01C 21/36 (2006.01)

(52) U.S. Cl.
CPC ....... *G01C 21/3453* (2013.01); *G01C 21/3629* (2013.01); *G01C 21/3691* (2013.01); *G01C 21/32* (2013.01); *G01C 21/34* (2013.01)

(58) Field of Classification Search
None
See application file for complete search history.

(56) References Cited

U.S. PATENT DOCUMENTS

| | | | |
|---|---|---|---|
| 5,528,501 | A | 6/1996 | Hanson |
| 6,256,579 | B1 | 7/2001 | Tanimoto |
| 6,308,133 | B1 | 10/2001 | Loffert et al. |
| 7,345,628 | B2 | 3/2008 | Soundararajan |
| 7,636,632 | B2 | 12/2009 | Wolterman |

(Continued)

OTHER PUBLICATIONS

Anonymous Authors, "Method and System for Optimizing Navigation Instructions Based on Familiarity of Routes," Source: ip.com; ip.com No. IPCOM000213903D; Jan. 5, 2012; pp. 1-3.

(Continued)

*Primary Examiner* — John R Olszewski
*Assistant Examiner* — Gerrad A Foster
(74) *Attorney, Agent, or Firm* — Cantor Colburn LLP; Nicholas D. Bowman

(57) ABSTRACT

Embodiments relate to providing navigation instructions to a user for reaching a destination via a route planned on a map of a navigation system, said map comprising a plurality of road segments, at least a subset of said road segments comprising an assigned familiarity score. An aspect includes tracking a route taken by a user. Another aspect includes calculating an updated familiarity score of the one or more road segments of the tracked route using at least one of a user-defined updating variable and an updating variable based on at least one dynamically obtained actual travelling condition. Yet another aspect includes storing the updated familiarity score in a data storage of the navigation system.

20 Claims, 9 Drawing Sheets

(56) References Cited

U.S. PATENT DOCUMENTS

| 7,680,749 | B1 | 3/2010 | Golding et al. |
| 2006/0080034 | A1 | 4/2006 | Hayashi |
| 2010/0145608 | A1 | 6/2010 | Kurtti et al. |
| 2010/0324816 | A1 | 12/2010 | Highstrom et al. |
| 2011/0054775 | A1 | 3/2011 | Snyder |
| 2011/0130956 | A1 | 6/2011 | Tracton et al. |
| 2011/0137549 | A1 | 6/2011 | Gupta et al. |
| 2011/0153191 | A1 | 6/2011 | Dhanani |
| 2012/0158283 | A1 | 6/2012 | Arastafar |

OTHER PUBLICATIONS

Authors Unknown "System and Method for Effectively Implementing an Electronic Navigation Device," Source: ip.com; IP.com No. IPCOM000170206D; May 12, 2008; Copyright: 2008, Sony Electronics Inc.; pp. 1-36.

GB Application No. GB1217854.7; Search Report dated Jan. 30, 2013; pp. 1-4.

IBM, "Context Based Display of POI's in a GPS Car Navigation System," Source: ip.com; IP.com No. IPCOM000178276D; Jan. 21, 2009; 2 pages.

US 9,476,724 B2

INTELLIGENT ROUTE NAVIGATION

DOMESTIC PRIORITY

This application is a continuation of and claims priority from U.S. patent application Ser. No. 14/046,070, filed on Oct. 4, 2013, entitled "INTELLIGENT ROUTE NAVIGATION," which in turn claims priority from the Great Britain Patent Application No. GB 1217854.7, filed Oct. 5, 2012, and the entire contents of both these applications are incorporated herein by reference.

BACKGROUND

The present disclosure relates generally to navigation, and more specifically, to providing navigation instructions to a user for reaching a destination via a route planned on a map comprising a plurality of road segments.

Nowadays, many travelers rely on guidance from navigation equipment, e.g. global position by satellite (GPS) navigational systems or navigational system utilizing surface transmissions, to find their way to an intended destination. This applies to people travelling in many different ways, e.g. by foot or by bike, although the use of such navigation equipment is most prevalent in vehicles, e.g., cars, vans, lorries and so on. Many different navigational systems are available, ranging from applications for smart phones to high-end integrated systems.

The navigational system typically relies on some form of map of the global area in which the user of the system is travelling. Such maps are typically divided in multiple road segments for which travel characteristics such as length, typical average speed and/or speed limit, actual traffic information and so on will be available, with the system calculating a route to the intended destination based on some cost function, which may be user-defined, e.g. a shortest route, shortest route avoiding motorways, fastest route, most fuel-efficient route, and so on.

In terms of road safety, it is important that the user limits interaction with the navigation system to the minimum amount, e.g. to avoid distraction from surrounding traffic. To this end, it is important that the navigation system delivers a satisfactory user experience, as an unsatisfactory experience may entice the user to alter the settings of the navigation system, thus increasing the risk of accidents. Although this can be mitigated to some extent by hands-free control of the navigation system, it still requires the user to concentrate on altering the settings of the navigation system, which is undesirable. It is therefore preferable to reduce the risk of a user becoming dissatisfied with the service provided by the navigation system, such that the user would feel less inclined to intervene.

An example of such nuisance instructions is the navigation system producing detailed route guidance instructions in an area with which the user is familiar. This can often lead to the user trying to switch off the navigation system whilst in traffic, e.g. when operating a vehicle at the same time, which can cause the user to give diminished attention to the traffic, thus jeopardizing road safety. Many users want to use navigation systems even on routes that they are familiar with, for instance because in navigation mode the navigation system will provide the user with up-to-date traffic information such that the user can avoid getting stuck in traffic. In such a scenario, a user does not require the navigation system to provide detailed navigation instructions until the user takes a recommended unfamiliar alternative route to avoid traffic congestion.

This problem is addressed in U.S. Pat. No. 6,308,133 B1, in which a navigation system has awareness of areas that are familiar to the user, such that the nature of the navigation instructions are matched to the familiarity of the user with the area through which the user drives. The navigation system has a learning module that determines if a user is familiar with a certain route by recording the frequency of use of that route. This approach has the disadvantage that for different users of the same navigation device, inappropriate instruction levels may be provided due to the fact that an occasional user may not be familiar with a route that is frequently used by the main user of the navigation system.

This problem is addressed in US 2010/0324816 A1, which discloses a navigation system that identifies the user of the navigation system such that it is ensured that appropriate navigation instructions are provided for the identified based on a selected cartographic resolution relevant to that user. The navigation system may include a learning functionality that enables it to dynamically react to driving patterns, driving habits, traffic trends and/or user interaction with the system. This enables the system to learn areas and roadways that a user frequents to present improved navigation instructions to the user.

However, it has been found that the learning functionality of the state of the art navigation systems can be inaccurate, and in certain circumstances can wrongly assume that navigation instructions can be omitted due to the incorrect conclusion that the user is familiar with a part of the scheduled route.

BRIEF SUMMARY

Embodiments relate to providing navigation instructions to a user for reaching a destination via a route planned on a map of a navigation system, said map comprising a plurality of road segments, at least a subset of said road segments comprising an assigned familiarity score. An aspect includes tracking a route taken by a user. Another aspect includes calculating an updated familiarity score of the one or more road segments of the tracked route using at least one of a user-defined updating variable and an updating variable based on at least one dynamically obtained actual travelling condition. Yet another aspect includes storing the updated familiarity score in a data storage of the navigation system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Figure 1:
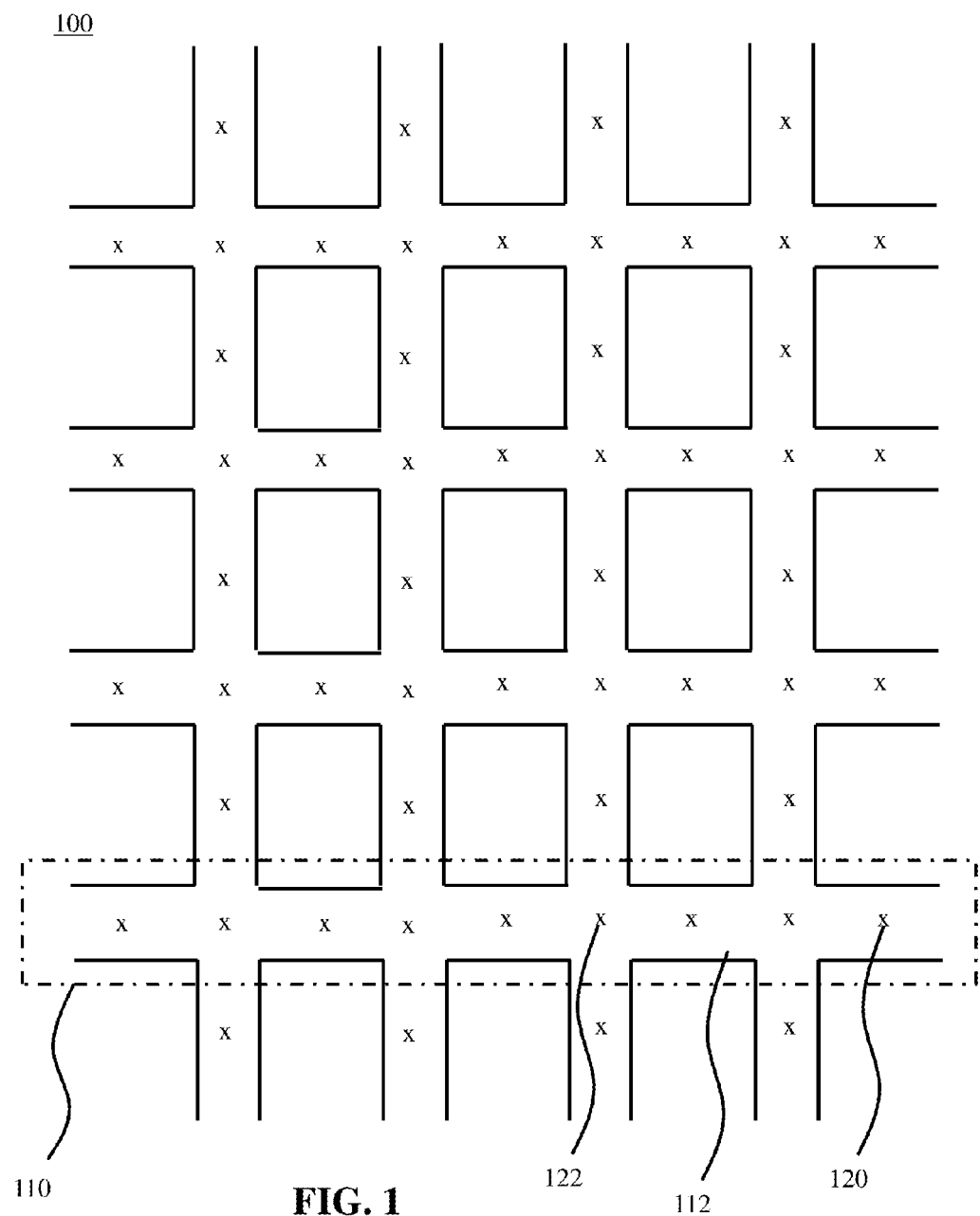
FIG. 1 schematically depicts part of a map of a navigation system.

It should be understood that the Figures are merely schematic and are not drawn to scale. It should also be understood that the same reference numerals are used throughout the Figures to indicate the same or similar parts.

In the context of the present application, where embodiments constitute a method, it should be understood that such a method is a process for execution by a computer, i.e. is a computer-implementable method. The various blocks of the method therefore reflect various parts of a computer program, e.g. various parts of one or more algorithms. The various embodiments of a method may be stored on a computer program product comprising a computer-readable storage medium. The computer-readable storage medium may be any medium that can be accessed by a computer for the retrieval of digital data from said medium. Non-limiting examples of a computer-readable storage medium include a compact disk (CD), digital video disk (DVD), flash memory card, a universal serial bus (USB) memory stick, a random access memory, a read-only memory, a computer hard disk, a storage area network, a network server, an Internet server and so on.

Various embodiments seek to provide a navigation method that more accurately predicts the ability of a user to become familiar with a route. Various embodiments seek to provide a computer program product including executable program code for implementing such a navigation method. Various embodiments seek to provide a navigation system adapted to implement such a navigation method.

In accordance with an aspect, there is provided a method for providing navigation instructions to a user for reaching a destination via a route planned on a map of a navigation system, said map comprising a plurality of road segments, at least a subset of said road segments comprising an assigned familiarity score, the method comprising tracking a route taken by a user; calculating an updated familiarity score of the one or more road segments of the tracked route using at least one of a user-defined updating variable and an updating variable based on at least one dynamically obtained actual travelling condition; and storing the updated familiarity score in a data storage of the navigation system.

Various embodiments thus factor in variations in the learning abilities of different users of a navigation system, which variations may be intrinsic to the user or may be caused by variations in the travel conditions, as a user is more likely to get acquainted with a route e.g., during daylight, calm traffic conditions and/or clear weather, as opposed to during darkness, busy traffic and/or adverse weather conditions, when the ability of the user to learn the route will be diminished. Consequently, the familiarity score assigned to a road segment can be more accurately updated when factoring in such variables, which improves subsequent decision making regarding the omission of certain navigation instructions when the navigation system in navigation mode.

In a navigation mode, embodiments of the method may further comprise planning a route to a user-defined destination; selecting navigation instructions based on the familiarity score of a set of road segments of the planned route; and presenting the selected navigation instructions to the user. This navigation mode benefits from improved quality assessment of the familiarity of a user with certain routes, which reduces the risk that the user is provided with an inappropriate level of instructions.

In an embodiment, the user-defined updating variable expresses the ability of the user to become familiar with an unknown route and may be set by the user, e.g. by presenting the user with a selection menu for selecting the user-defined updating variable; and receiving the user-defined updating variable from the user. This has the advantage that the method can accurately update familiarity scores for road segments based on the user's own perception of his or her route learning abilities.

In further embodiments, the actual travel conditions required for updating the familiarity score are wirelessly retrieved from an external data source, such as a traffic information service, an actual weather update provider such as a meteorological office and so on.

The calculation of the updated familiarity score using at least one of a user-defined updating variable and an updating variable based on at least one dynamically obtained actual travelling condition may further be combined with the frequency of use of said road segment to further improve the accuracy of the prediction of the improved familiarity of the user with the road segment.

The method may further comprise receiving a user-defined known area, wherein said assigning comprises assigning a defined familiarity score to all road segments within said known area. This further improves the knowledge of the navigation system of the areas the user is familiar with, such that nuisance instructions can be avoided from the onset, thus improving the user experience and further improving the accuracy of the learning ability of the navigation system.

In an embodiment, the road segments within said known area are excluded from said updating because it is already known that the user is familiar with the road segments such that updating the familiarity score becomes unnecessary.

In another embodiment, selecting navigation instructions comprises replacing a first number of navigation instructions for navigating the user over a plurality of road segments of the planned route with a smaller number of navigation instructions in case the familiarity score of said plurality of road segments exceeds a defined threshold. This way, it is avoided that unnecessary instructions are issued to the user in an area or on a route the user is familiar with.

Embodiments of selecting said navigation instructions may comprise selecting an initial navigation instruction for navigating the user from a first road segment to a second road segment of the route; assigning a relevance score to said initial navigation instruction; and cancelling the selected initial navigation instruction if the familiarity value of at least one of the road segment and the second road segment is at least the assigned relevance score. In this embodiment, e.g. a change of roads in a route is assessed based on the importance of the change, such that navigation instructions for the user to make the change, e.g. take a junction, are only omitted when the user familiarity score of that particular segment of the route is high enough for the given importance level. This way, the risk of a user missing a road change because of an incorrectly omitted instruction is greatly reduced.

The method may further comprise planning said route between the actual location of the user and a user-defined destination such that the planned route has an optimal aggregate familiarity score. This is particularly advantageous in case a user has frequently deviated from a previously planned route, as this is an indication that the user is aware of a better route that may not be found using routine route planning algorithms. By factoring in route alternatives with higher aggregate familiarity scores when planning the route, the method is capable of providing the user with a route plan that is likely to be particularly acceptable to the user.

In accordance with another aspect, there is provided a computer program product comprising a computer-readable storage medium having computer-readable program code, when executed on a computer comprising at least one processor, causing the at least one processor to implement the navigation method according to an embodiment.

In accordance with yet another aspect, there is provided a navigation system comprising at least one processor and the computer program product of an embodiment, wherein the at least one processor is adapted to execute said computer-readable program code. Such a navigation system is capable of providing its user with improved learning capabilities in respect of the familiarity of the user with a particular route as previously explained.

In an embodiment, the navigation system further comprises an input device, a display device and an audio output device, wherein the input device is adapted to receive user input including a destination; the display device is adapted to display at least a portion of the map; and the audio output device is adapted to output the selected navigation instructions. The display device may form part of the input device, e.g. the display device may be a touch screen for receiving user instructions by touch.

FIG. 1 schematically depicts a portion of a map 100 of a navigation system. The map 100 typically comprises a system of interconnected roads 110. The map may be stored in any suitable format in the navigation system. As such formats are well-known per se, this will not be explained in further detail for the sake of brevity.

Such roads 110 may be divided into road segments 112. For instance, in the map 100, each road has two types of road segments 112: a first road segment type defined between two junctions of the road 110 and a second road segment type defining a junction between two roads. This approach is favorable because a user usually will travel over a complete a road segment of the first type because the user can only leave the road 110 at a junction, i.e. at a road segment of the second type. It is noted for the avoidance of doubt that a road segment of the second type is shared by at least two roads 110 due to the fact that it defines a junction between roads.

However, it should be understood that the road 110 may be divided into any number of road segments 112 in any suitable manner. For instance, the above approach may be combined with applying a maximum length to a single road segment such that in particular a road segment of the first type may be divided into multiple segments if a single segment would exceed the maximum length. Other approaches are known per se and will be immediately apparent to the skilled person.

As shown in FIG. 1, the road segments 112 of the map 100 may be assigned a default user familiarity score 122, e.g. the score '0' or any other suitable default value, each score being indicated by the variable 'x' in FIG. 1. A user familiarity score is an expression of the likelihood that a user is familiar with the road segment, such that the user is unlikely to require detailed navigation instructions when travelling over such a road segment. Such an approach is for instance known from US 2010/0324816 A1, where in paragraph [0031] it is explained that the navigation system may monitor the frequency of use of particular segment(s) of a route such as a motorway and use this metric to decide if a user should be presented with a reduced set of navigation instructions if a planned route includes road segments that exhibit a familiarity score indicating a high use frequency.

Such user familiarity scores 122 for instance may be assigned to all road segments of the map, or may be only be assigned to road segments of routes planned for a user or travelled over by a user, or may only be assigned to road segments in an area surrounding a user-specified location of interest or in an area surrounding a location visited by the user and so on. In an embodiment, the navigation system comprises distinct user profiles for different users of the navigation system, in which each user profile contains user familiarity scores 122 that are specific to the user associated with that user profile.

In embodiments, accuracy of updating the user familiarity scores 122 for a given user is improved, such that the level of navigation instructions based on the predicted familiarity of the user with part of a planned route can be selected with increased accuracy. This may be achieved in a number of ways.

Figure 2:
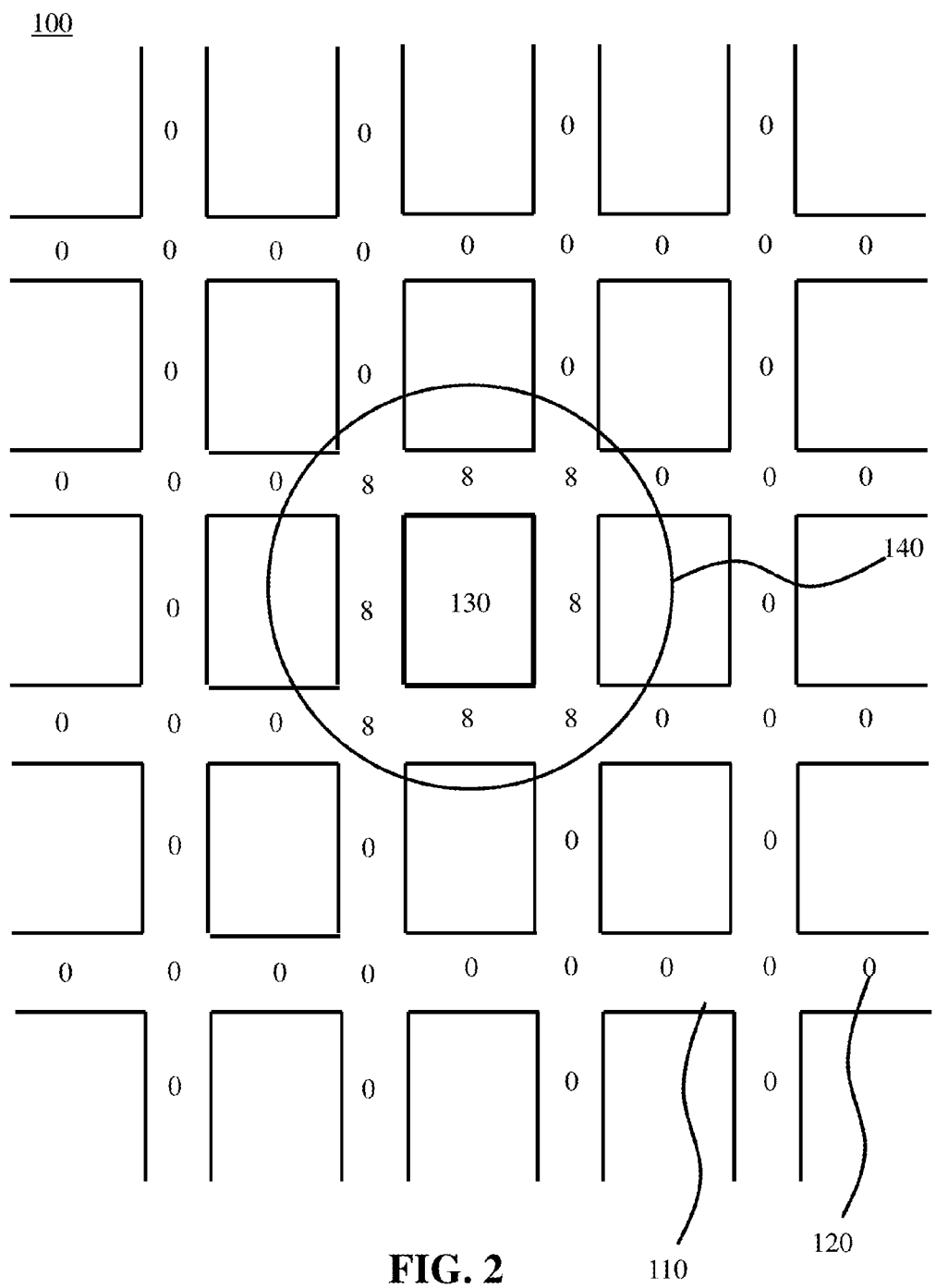
FIG. 2 schematically depicts part of a map of a navigation system including a section updated in accordance with an embodiment.

A first example is shown in FIG. 2, in which a user has defined an area 140 on the map 100 to indicate an area in which the user does not want to receive detailed navigation instructions because the user is familiar with the roads in the area 140. To this end, all road segments considered to fall within the user-defined area 140 will be assigned a user familiarity score 122 indicating that the user is familiar with the road segment. The user familiarity score 122 of the road segment 112 may be replaced by a default value, e.g. a high value such as '8' or '9' or any other suitable value, indicating that the user is familiar with the road segment or alternatively may be replaced by a user-defined value.

The user may define the area 140 and, if applicable, the user-defined familiarity score 122 in any suitable manner, e.g. using any suitable user interface of the navigation system, e.g. a touch screen, a track ball, a selection wheel, a keypad, a remote control, a voice-recognition module and so on. The user may define the actual area 140 or may instead define a known location 130, after which the navigation system defines the area 140 around the location 130 in any suitable manner, e.g. using a predefined or a user-defined radius. The navigation system may use any suitable algorithm to decide which road segments 112 fall within or outside the defined known area 140, e.g. algorithms using well-known geometric principles. The updated user familiarity scores 122 are updated to a score that is high enough to ensure that the navigation system will not provide the user with detailed navigation instructions in the area 140, as will be explained further below.

Figure 3:
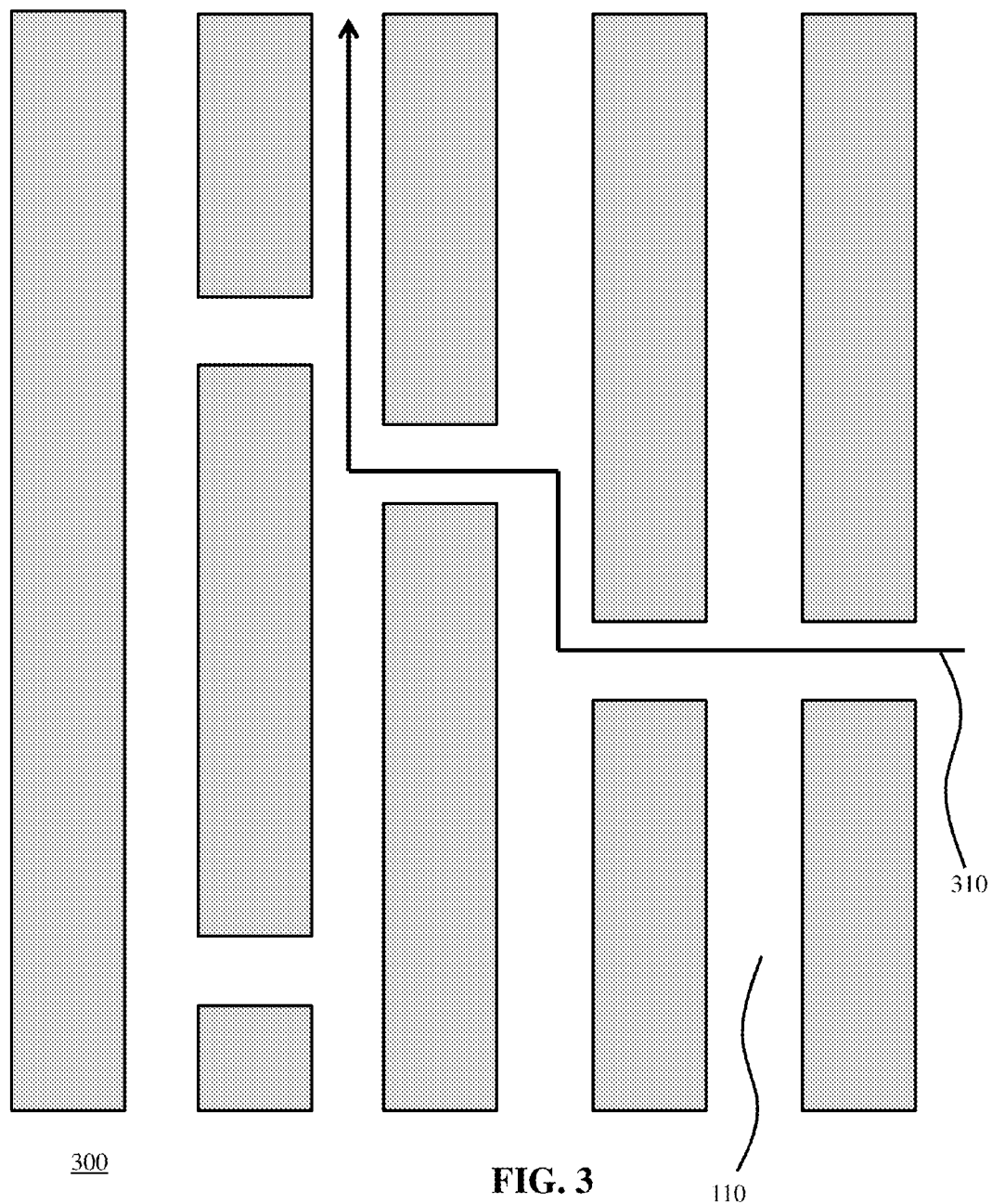
FIG. 3 schematically depicts part of a map of a navigation system including a highlighted route taken by a user of the navigation system.
Figure 4:
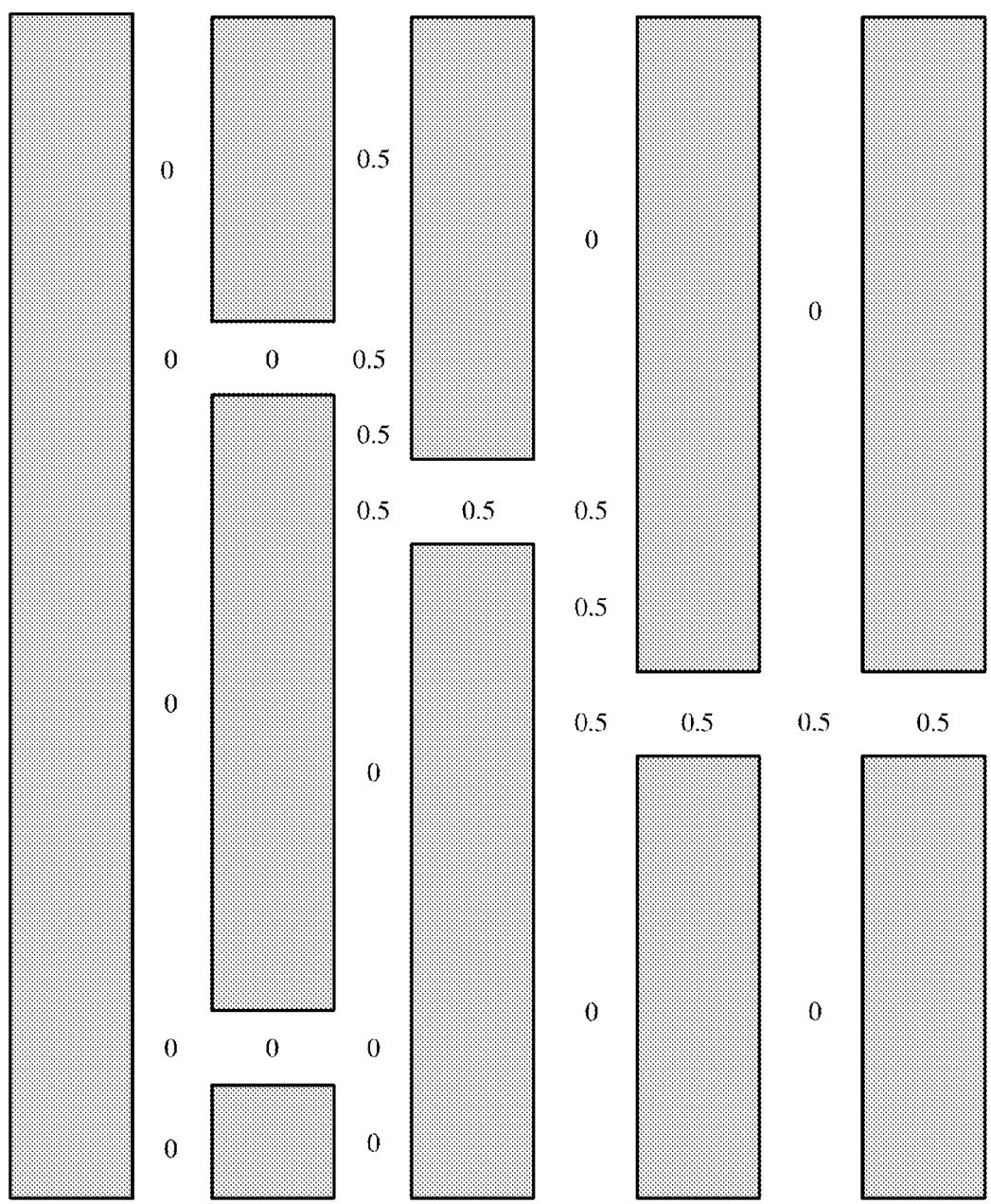
FIG. 4 schematically depicts part of a map of a navigation system including a section corresponding to the highlighted route in FIG. 3 updated in accordance with an embodiment.

A second example of a method of updating the user familiarity scores 122 for a particular user is shown in FIGS. 3 and 4, and will be discussed with the aid of the flow chart of FIG. 5. The method 500 is typically always executed by the navigation system, i.e. whether or not the navigation system is in navigation mode, that is, is providing route navigation instructions to a user following a user providing the navigation system with a desired destination. In other words, this method may also be executed when the navigation system is in dormant mode, i.e. is not requested by the user to provide navigation instructions.

As previously explained, the method 500, after having been launched, e.g. by the navigation system having been powered up and the user of the navigation has been identified in any suitable manner in case of a navigation system comprising multiple user profiles, will assign an initial user familiarity score 122 to at least some of the road segments 112 of the map 100 in block 510 as previously explained. Block 510 may only be executed if the relevant road segments 112 have not yet been assigned such an initial user familiarity score 122; if such an initial user familiarity score 122 has previously been assigned, block 510 is omitted from method 500.

Next, the method 500 progresses to block 520, in which the navigation system tracks a route followed by the (identified) user. An example of such a route 310 over selected roads 110 is schematically depicted in map 300 of FIG. 3. Subsequently, the method proceeds to block 540 and updates the user familiarity score 122 of the road segments 112 of the tracked route 310. This will be explained in more detail below. In an embodiment, the method 500 may comprise the optional block 530 of checking if a road segment 112 of the tracked route 310 falls within a previously defined area 140 that is known to the user, in which case block 540 may be omitted if this is the case.

In an embodiment, the user familiarity score 122 of a road segment 112 is updated on-the-fly, i.e. as soon as the user has completed travelling over the road segment 112. In an alternative embodiment, the navigation system stores the road segments 112 of the tracked route 310 on a data storage device such as a memory or hard disk, and updates the user familiarity scores 122 of the road segments 112 once it can be assumed with a high degree of certainty that the journey of the user has ended, e.g. because the position of the navigation system has not changed during a period exceeding a defined threshold, because the user has powered down a vehicle and so on. Other suitable approaches for choosing the actual moment in time during which the user familiarity score 122 are to be updated will be apparent to the skilled person.

In accordance with an aspect, the user familiarity score 122 of the road segments 112 of the tracked route 310 is updated by a factor or amount calculated by an algorithm that includes one or more variables, such that the updating factor can incorporate factors that influence the ability of the user to familiarize himself with the route 310. Such factors typically can be divided into two categories, namely the intrinsic learning ability of the user and environmental factors including but not limited to daylight conditions, weather conditions and traffic conditions. In an embodiment, at least the intrinsic learning ability of the user is included as a variable in the algorithm. In another embodiment, at least one environmental factor is included as a variable in the algorithm. In a further embodiment, the intrinsic learning ability of the user and at least one environmental factor are included as variables in the algorithm. In yet another embodiment, the variables to be included in the algorithm may be defined by the user, e.g. by providing the user with a selection menu on a display device of the navigation system in which the user can select one or more of the aforementioned variables. Alternatively, the variables to be used by the algorithm may be fixed in the navigation system.

The navigation system may obtain the required variables in any suitable manner. For instance, the user may specify his or her intrinsic learning ability when they start using the navigation system or prior to commencing a journey. The latter has the advantage that a user can inform the navigation system that his or her learning abilities have temporarily diminished, e.g. because of medical reasons such as a headache. The navigation system may present the user with a selection menu in which the user is presented with text-based selection options, e.g. 'slow learner/normal learner/fast learner' or alternative phrasings having an equivalent meaning. Alternatively, the user may be presented with a dialogue box in which the user can indicate on average how often the user has to travel over a route before it becomes familiar, and so on. Other suitable user interrogation techniques will be apparent to the skilled person.

Upon receiving the user-specified intrinsic learning ability, the navigation system may translate the user response into a numerical value to be used as the appropriate variable in the algorithm for updating the respective user familiarity scores 122 of the road segments 112 of the tracked route 310.

The navigation system may obtain the appropriate values of the environmental factors from external data sources, e.g. using a wireless connection to such an external data source. Any suitable wireless protocol, e.g. wireless internet, a wireless telephony protocol such as a 3G or 4G protocol and so on may be used.

For instance, the navigation system may connect to an external data source providing meteorological data such as sunrise and sunset times and/or actual weather conditions for the area containing the tracked route 310, e.g. sunshine, cloudy, rain and so on, such that the navigation system can assign an appropriate value to the external factor variable to be used. For assessing whether the tracked route 310 has been completed (mainly) during the day or night, the navigation system may monitor the start and completion times of the tracked route 310 and compare this against the sunrise and sunset times obtained from the external data source. The navigation system may further connect to an external data source providing traffic information to obtain up-to-date traffic conditions for the area including tracked route 310.

In a further embodiment, the algorithm may further include a frequency of travel over the tracked route 310 as it is known per se that a route that is used more frequently will be learned more quickly by a user.

The algorithm may take any suitable form. For instance, at least one of the environmental factors and the route travelling frequency may be used as a moderation or scaling factor of the intrinsic ability (IU) of the user to learn a given route. An example of such an algorithm is shown in equation (I), with potential values for the various variables, e.g. scaling factors used by the algorithm shown in Tables I-IV.

$$X_{new} = X_{old} IU * (F * WC * DC * TC) \quad \text{(EQ. I)}$$

TABLE I

| Intrinsic user learning ability | Scaling factor (IU) |
|---|---|
| Not Considered or Slow learner (needs to travel over a route at least 5 times to become familiar with it) | 1 |
| Average learner (needs to travel over a route 2-4 times to become familiar with it) | 3 |
| Fast learner (needs to travel over a route only once to become familiar with it) | 5 |

TABLE II

| Weather condition | Scaling factor (WC) |
|---|---|
| Not Considered or Clear | 1.0 |
| Overcast | 0.8 |
| Rain | 0.5 |

TABLE III

| Daylight condition | Scaling factor (DC) |
|---|---|
| Not considered or Day | 1.0 |
| Night | 0.5 |

TABLE IV

| Traffic condition | Scaling factor (TC) |
|---|---|
| Not considered or Light traffic | 1.0 |
| Congestion | 0.5 |

TABLE V

| Route use frequency | Scaling factor (F) |
|---|---|
| Not considered or >6 times/year | 1.0 |
| 2-6 times/year | 0.8 |
| <2 times/year | 0.5 |

In Equation I, $X_{new}$ and $X_{old}$ are the updated value and the previous value of the user familiarity scores 122 of the road segments 112 of the tracked route 310.

A default value of unity or 1 is assigned to a scaling factor if the associated condition should not provide moderation, e.g. because the associated condition has an optimal value or is excluded from the algorithm, e.g. by the user, or because insufficient data is available, such as in the case of frequency of use of a route. It should be understood that the scaling factors and the granularity, i.e. number of different values, of these variables are selected by way of non-limiting example only and that any desired granularity and any desired scaling factor to each condition may be selected.

In addition, it should be understood that many alternatives to equation (I) as the basis for the user-dependent adjustment algorithm will be apparent to the skilled person. For instance, rather than moderating the intrinsic ability (IU) of a user to learn a route, the algorithm may seek to update the old user familiarity score 122 $X_{old}$ by a fixed user-independent amount Y, which amount Y is to be moderated by the aforementioned user-dependent and environmental moderation factors. A non-limiting example of such an algorithm is shown in Equation II, from which the optional moderation factor F has been omitted by way of example.

$$X_{new}=X_{old}Y*(IU*WC*DC*TC) \qquad \text{(EQ. II)}$$

It is of course also not necessary that the overall moderation factor is a product of individual moderation factors. This is demonstrated in the example Equation III, in which the moderation factor for moderating the intrinsic ability (IU) of the user to learn a given route is a sum of the individual moderation factors F, WC, DC and TC. Obviously, different values may have to be adopted for the moderation values, e.g. each moderation value may be zero if an optimal route learning condition is encountered, and may have different negative values depending on the level of deviation from the optimal route learning condition.

$$X_{new}=X_{old}IU*(F+WC+DC+TC) \qquad \text{(EQ. III)}$$

In a further example variation, the algorithm may define the amount by which the previous user familiarity scores 122 is updated based on a range of values of the combined variables that are considered by the chosen algorithm represented by function f in Table VI.

TABLE VI

| Combined variable score | Update amount for user familiarity score |
|---|---|
| f(F, IU, WC, DC, TC) < 1 | 0.25 |
| 1 < f(F, IU, WC, DC, TC) < 2 | 0.50 |
| f(F, IU, WC, DC, TC) > 2 | 1.00 |

It will be immediately apparent that many more modifications to the above algorithms are feasible. It should furthermore be understood that for different users, different, i.e. user-specific scaling factors IU and/or F for updating the user familiarity score 122 are applied in some embodiments, in which case the user is identified in any suitable manner, e.g. following user-specification of his or her identity, by voice recognition, by recognition of the seat position associated with the user and so on.

Example 1 (using algorithm I and the scaling factors of Table I-V): a slow learner of a route (IU=1) travels by night (DC=0.5) in light traffic (TC=1) and clear skies (WC=1) over a route 310. The frequency of use is not considered (F=1). The amount F*IU*(WC+DC+TC) by which $X_{old}$ is updated, i.e. increased, is 1*1*0.5*1*1=0.5. FIG. 4 schematically depicts the map 300 including the accordingly updated user familiarity scores 122 of the road segments 112 of the tracked route 310.

Example 2 (using algorithm I and the scaling factors of Table I-V): a fast learner of a route (IU=5) travels by day (DC=1) in light traffic (TC=1) and under overcast conditions (WC=0.8) over a route 310. The user has traveled over the same route once before in the last year (F=0.5). The amount F*IU*(WC+DC+TC) by which $X_{old}$ is updated, i.e. increased, is 5*1*1*0.8*0.5=2.

Figure 6:
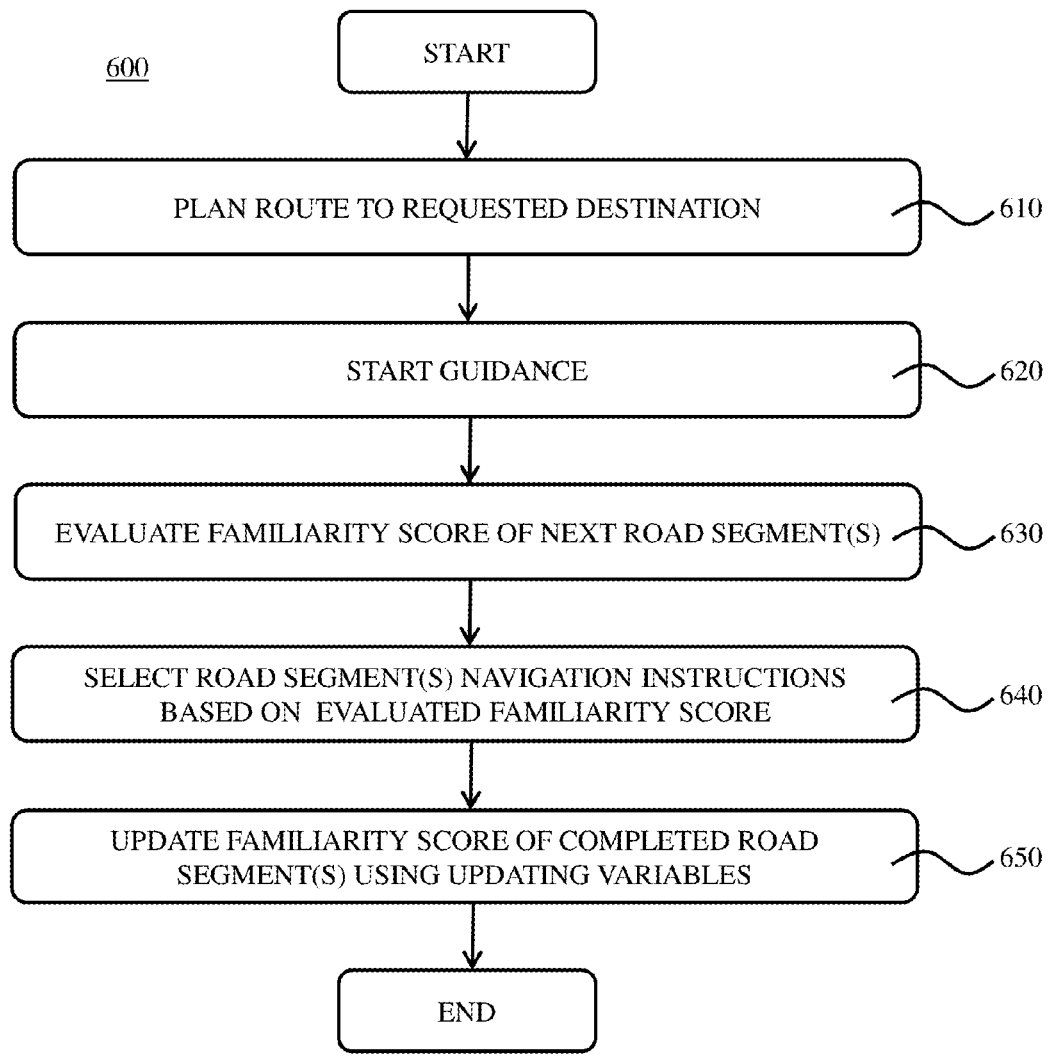
FIG. 6 depicts a flowchart of a method of route navigation according to an embodiment.

In a navigation mode, the navigation system according to embodiments may implement a navigation method as shown in FIG. 6 in which up-to-date user familiarity scores 122 are used to decide if a user should be presented with detailed (spoken) navigation instructions or whether the user is familiar enough with a particular section of the planned route to replace the detailed instructions with a smaller number of instructions such as a global instruction that navigates the user to an end point of the familiar route section or, in some embodiments, not provide the user with any (spoken) instructions at all.

In an embodiment, the decision to provide the user with a reduced set of navigation instructions in an area familiar to the user may be based on the user familiarity score 122 alone, in analogy with the state of the art. For instance, after identification of the user, the navigation system may plan a route in block 610 to a designation specified or requested by the user using any suitable route planning algorithm, which are of course well known per se and will therefore not be discussed in further detail for the sake of brevity only. After planning the route, the navigation system will start its guidance in block 620, e.g. by displaying the planned route on a display screen and/or providing the user with spoken instructions to guide the user along the planned route.

The navigation system further evaluates the user familiarity scores 122 of the planned route to detect sections of the route that are familiar to the user in block 630. Although block 630 is shown as a separate block following block 620, it should be understood that block 630 may be performed at any suitable point of the method 600, e.g. as a part of block 620, before block 620 and so on. Any suitable algorithm may be used in block 630 to detect sections of the route that are familiar to the user, e.g. an algorithm that detects a string of adjoining road segments 112 in the planned route that each have a familiarity score 122 above a defined threshold.

In block 640, the navigation system subsequently selects the level of detail to be provided in the navigation instructions based on the familiarity score evaluation performed in block 630. For instance, upon a user entering a familiar area along the route, the navigation system can decide to stop providing the user with detailed, e.g. turn-by-turn, instructions and replace the detailed instructions with a smaller number of more global navigation instructions, e.g. a single instruction such as "proceed to junction 6 of motorway M25" that will allow the user to travel within the familiar area without receiving navigation instructions at an annoying level of detail. In an embodiment, the navigation system may decide not to issue any spoken instructions when the user travels within such a familiar area.

In another embodiment of block 640, the decision on whether to provide the user with a reduced set of navigation instructions in an area familiar to the user may further include an evaluation of the importance of the navigation instruction to be withheld from the user. In particular, the navigation system may assign a relevance score to a road change in the planned route, i.e. to the instruction for directing the user from a first road segment to a second road segment of the part of the planned route the user has some familiarity with. This is based on the recognition that certain types of route changes are more straightforward and intuitive than other types of route changes, such that it is more likely that the user is familiar with the more intuitive route changes. For instance, a user will more likely be familiar with major junctions of motorways in an area familiar to the user than with junctions between country lanes in such an area, not in the least because the motorway junctions will be better signposted, better lit and so on than the junctions between country lanes.

This may be evaluated by the navigation system by evaluating the relevance of the road change in the planned route, and assigning an appropriate relevance score to the road change, e.g. by giving a higher relevance score to the junction between country lanes than to the motorway junctions. The assigned relevance score may be compared with the user familiarity score 122 assigned to the one or more road segments associated with the road change, with the navigation system only cancelling the selected initial navigation instruction if the familiarity value of at least one of the associated road segments is at least the assigned relevance score. In an embodiment, the associated road segment may be the junction between the two roads as explained in more detail in the detailed description of FIG. 1. This way, it is ensured that navigation instructions are only withheld from the user if it can be ensured with a high degree of confidence that the user is likely to recognize the need to change direction at the associated road junction.

Figure 5:
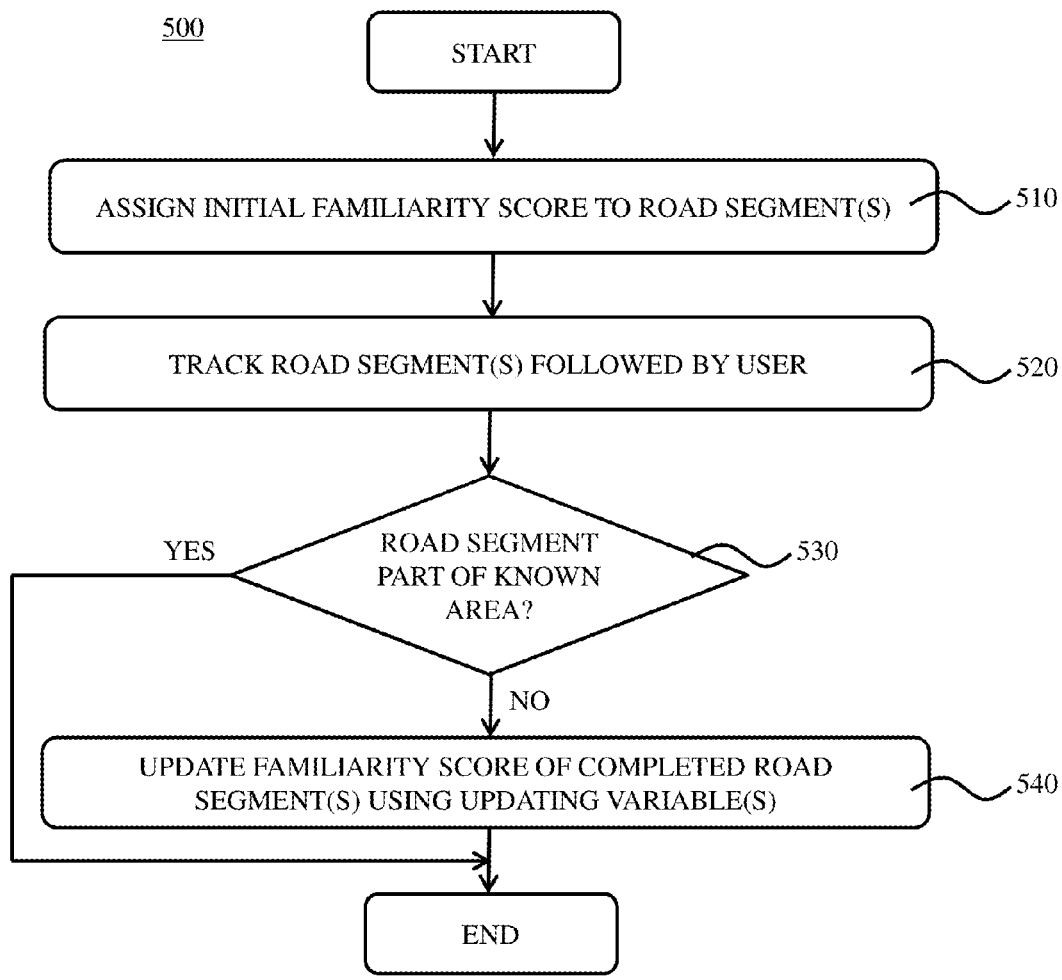
FIG. 5 depicts a flowchart of a method of route navigation according to an embodiment.

The method 600 further comprises block 650 of updating the user familiarity scores 122 of the road segments of the route travelled by the user as explained in more detail with the aid of FIG. 5 and its detailed description. This is particularly advantageous if the user decides to deviate from the planned route, as this may provide the navigation system with feedback that the user is aware of a suitable alternative to the route planned by the navigation system in block 610, which information may be used by the navigation system in subsequent executions of the method 600.

Figure 7:
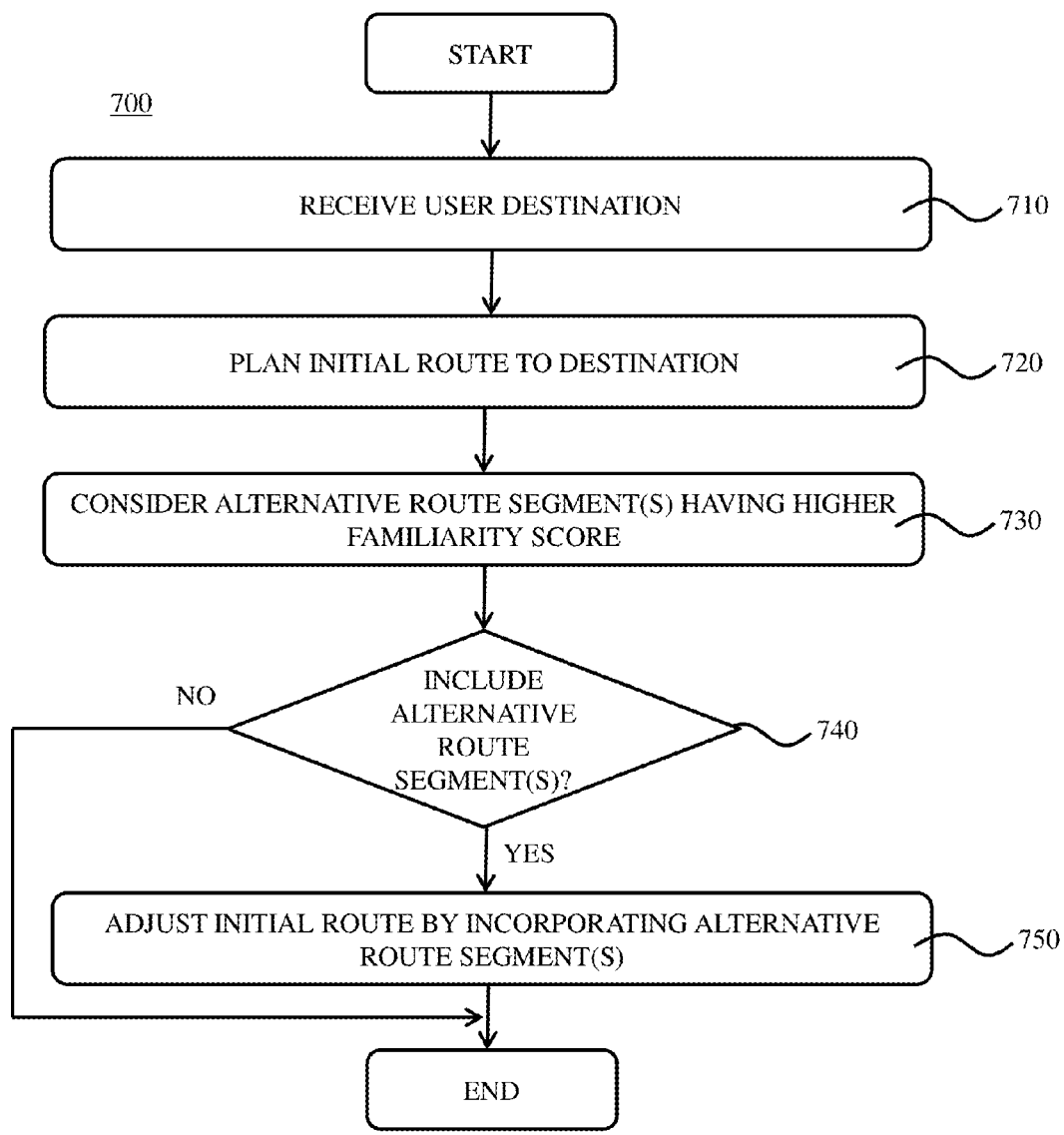
FIG. 7 depicts a flowchart of a method of route navigation according to an embodiment.

An embodiment of such a modified route planning block 610 that may be incorporated in the method 600 is shown in FIG. 7. In block 710, the navigation system receiving the required destination from the user and plans an initial route to the destination in block 720 as previously explained. Upon planning the initial route, the navigation system considers alternative routes to the required destination. Specifically, the navigation system tries to identify alternative routes or alternative sections of the planned route that appear particularly familiar to the user based on the user familiarity scores 122 assigned to these alternative routes or route sections.

Figure 8:
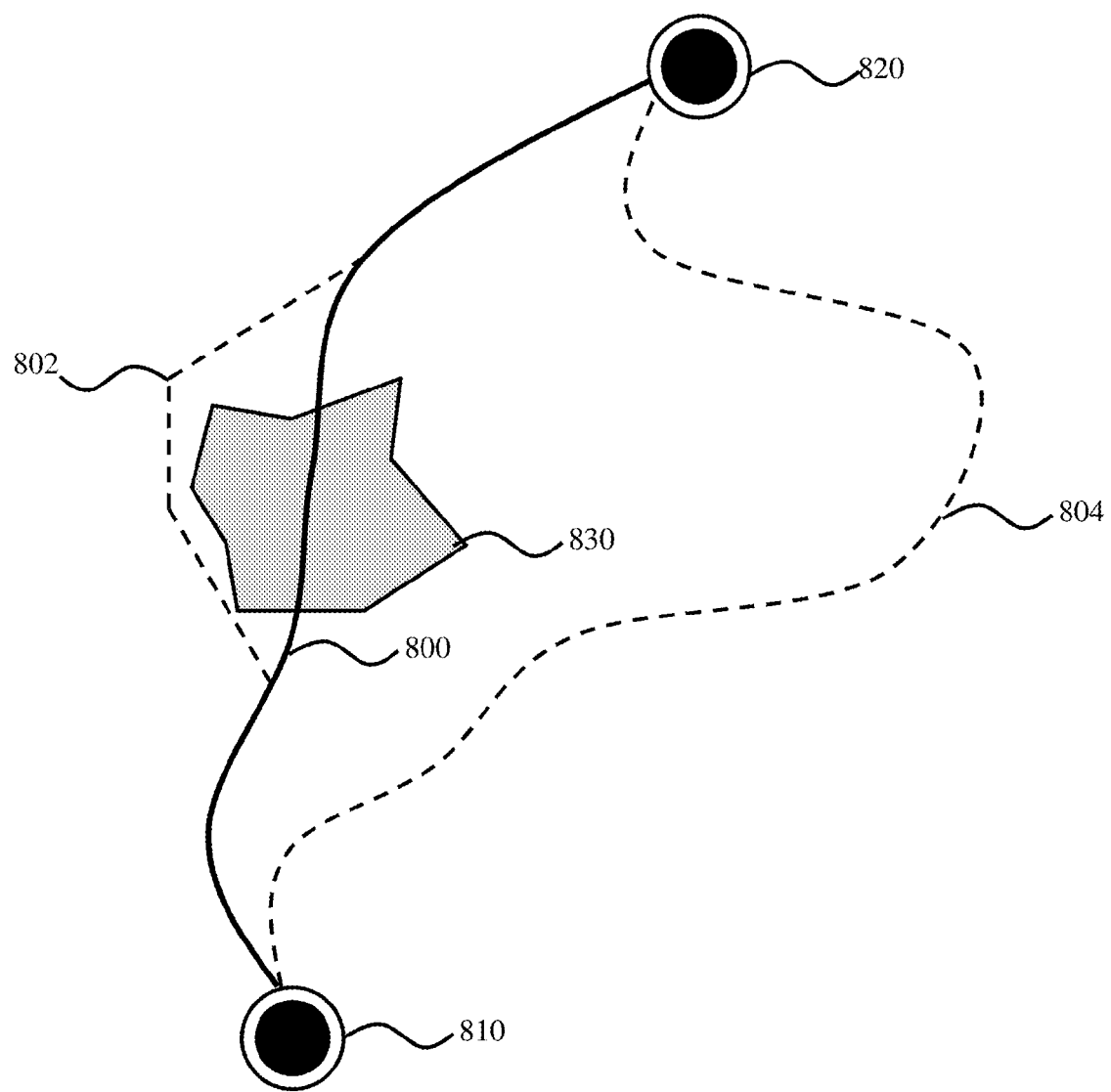
FIG. 8 schematically depicts part of a map used in the method of FIG. 7.

This concept is further explained with the aid of FIG. 8, which shows a planned route 800 between a starting point 810 and a user-specified destination 820 of the route 800. The route 800 further includes a section through a built-up area 830, e.g. a town or city. Upon the execution of block 730, the navigation system detects route segment 802 that bypasses the built-up area 830 and alternative route 804 between starting point 810 and destination 820 based on the user familiarity scores assigned to the road segments of the routes 802 and 804, which may indicate that these routes 802 and 804 are alternatives to the user and may for instance be used by the user to avoid potential traffic congestion in the built-up area 830.

Upon the identification of alternative route segments 802 or routes 804 the navigation system may decide in block 740 if the initially planned route 800 is to be amended by the alternative route or route segments that are familiar to the user, such as route segment 802 or route 804. This may for instance be achieved by presenting the route alternatives to the user in any suitable manner and receiving the route selected by the user, after which the initial route may be adjusted in block 750 if the user selected one of the more familiar route alternatives.

In an alternative embodiment of block 740 no user input is required. In this embodiment, the navigation system employs a navigation metric, e.g. overall distance of the alternative route(s), overall travel time over the alternative route(s), traffic conditions on the alternative route(s) to compare the different alternatives and selects the most appropriate route by factoring in the navigation metric as well as the aggregate user familiarity score.

It should further be understood that alternatives to this embodiment of method 700 are equally feasible. For instance, blocks 720, 730, 740 and 750 may be combined in a single complex route planning block in which no separate initial route is planned but in which the planned route directly results from the consideration of the suitability of the various alternative routes as explained above. The skilled person will understand that any suitable algorithm for planning the route between the actual location of the user and a user-defined destination such that the planned route has an optimal aggregate familiarity score may be considered. It is noted for the avoidance of doubt that in the context of the present application, the optimal aggregate familiarity score does not necessarily equate to the maximum aggregate familiarity score. In an embodiment, the optimal user familiarity score is the score that defines the optimal trade-off between the user's knowledge of the planned route and the metrics of the journey over the route, such as journey time and distance, as this maximizes the likelihood of providing the user with a route that the user considers suitable or optimal.

In yet another embodiment, block 730 may comprise evaluating the user profiles of different users to detect alternative route segments that may be considered. This is for instance advantageous if the current user has requested a route for which the navigation system has received actual traffic information indicating a delay on the planned route. By investigating if alternatives to affected parts of the route are available that are popular with other users, the navigation system can offer the current user recommended detours based on the travel patterns of other users. Such recommended detours may be volunteered by the navigation system or may be provided upon request of the current user.

Figure 9:
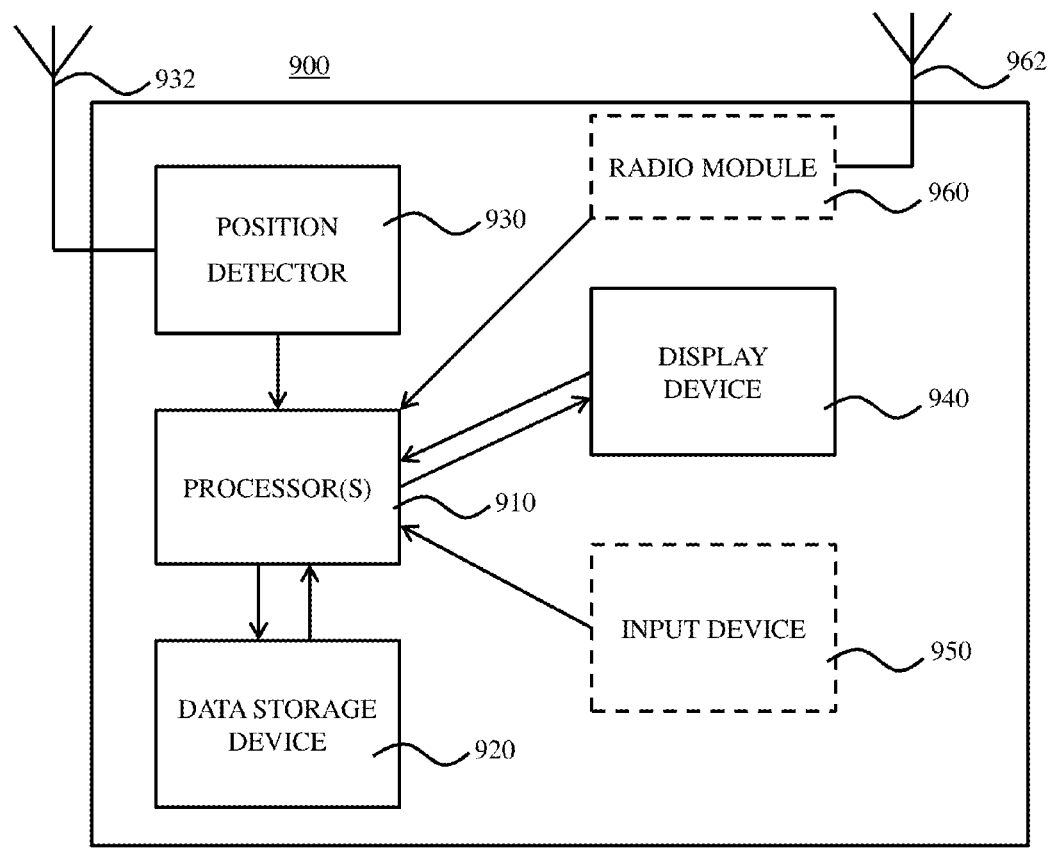
FIG. 9 schematically depicts a navigation system according to an embodiment.

FIG. 9 schematically depicts an example embodiment of a navigation system 900 adapted to execute the one or more embodiments of the methods of FIGS. 5-7. The navigation system 900 comprises one or more processors that are adapted to execute program code stored in a data storage device 920 such as a memory or a hard disk drive. The program code, when executed on the one or more processors 910, causes the navigation system 900 to implement the one or more of the embodiments as shown in FIG. 1-8 and/or described in the detailed description of FIG. 1-8.

The navigation system 900 further comprises a position detector 930 conductively coupled to an aerial 932 for detecting the actual position of the navigation system 900, e.g. by triangulation of signals transmitted from a known location, e.g. GPS using satellite signals or using mobile telephony signals from transmitters in different locations and so on. The position detector 930 is adapted to forward the detected position to the one or more processors 910, which detection position may be used as is well-known per se, e.g. for navigation purposes in a navigation mode of the navigation system 900.

The navigation system 900 may further comprise a display device 940 for displaying a map to the user and optionally providing the user with a user-interface, e.g. a touch screen, for providing the navigation system 900 with instructions. The display device 940 may be omitted in case the navigation system 900 is designed to provide spoken instructions only via an audio output device (not shown) such as a loud speaker or an output to which an external speaker may be connected. Preferably, the navigation system 900 comprises both a display device 940 and an audio output device.

In an embodiment, the navigation system 900 may further comprise an input device 950 for allowing the user to provide the navigation system 900 with instructions, e.g. at least one of a keypad, a track ball, a scroll wheel, a voice recognition module and so on. Such an input device may be integrated in the display device 940 as previously explained.

The navigation system 900 may further comprise a radio module 960 conductively coupled to an aerial 962 for receiving external information such as up-to-date traffic information, meteorological data and so on. The radio module 960 is conductively coupled to the one or more processors 910 and adapted to provide the one or more processors 910 with the received external information, which may be used by the one or more processors 910 in any suitable manner, e.g. to implement block 540, to provide the user with route alternatives based on the up-to-date traffic information and so on. Although aerials 932 and 962 are shown as separate aerials, it should be understood that a single aerial combining the functionalities of aerials 932 and 962 is equally feasible.

While particular embodiments have been described herein for purposes of illustration, many modifications and changes will become apparent to those skilled in the art. Accordingly, the appended claims are intended to encompass all such modifications and changes as fall within the true spirit and scope of this invention.

It will be clear to one of ordinary skill in the art that all or part of the method of various embodiments may suitably and usefully be embodied in additional logic apparatus or additional logic apparatuses, comprising logic elements arranged to perform the blocks of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method blocks, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising deploying computer program code operable to, when deployed into a computer infrastructure and executed thereon, cause the computer system to perform the method.

Various embodiments may be realized in the form of a data carrier having functional data thereon, said functional data comprising functional computer data structures to, when loaded into a computer system and operated upon thereby, enable said computer system to perform the method.

It will be clear to one skilled in the art that many improvements and modifications can be made to the foregoing exemplary embodiment without departing from the scope of the present invention.

What is claimed is:

1. A method for providing navigation instructions to a user for reaching a destination via a planned route on a map of a navigation system, said map comprising a plurality of road segments, at least a subset of said road segments comprising an assigned familiarity score, the method comprising:
    tracking the user's travel along the planned route, which comprises one or more road segments;
    calculating an updated familiarity score of the one or more road segments of the planned route using an updating variable based on at least one dynamically obtained actual weather condition; and
    storing the updated familiarity score in a data storage of the navigation system.

2. The method of claim 1, wherein the calculating of the updated familiarity score of the one or more road segments is further based on a user-defined updating variable, the user-defined updating variable being selected from a predetermined list of updating variables.

3. The method of claim 1, further comprising:
    determining navigation instructions for the planned route, which comprises a set of road segments;
    selecting a subset of the navigation instructions based on the updated familiarity score of the set of road segments of the planned route; and
    presenting the selected subset of navigation instructions during navigation.

4. The method of claim 3, wherein the selected subset of the navigation instructions includes navigation instructions associated with a subset of the set of road segments, wherein the subset of road segments have respective familiarity scores below a predetermined threshold.

5. The method of claim 1, wherein the calculating of the updated familiarity score of the one or more road segments is further based on a dynamically obtained actual travelling condition.

6. The method of claim 5, wherein the actual travelling condition comprises an actual light condition and an actual traffic condition in an area of travel.

7. The method of claim 1, further comprising dynamically obtaining the actual weather condition from an external data source.

8. The method of claim 1 wherein the calculating of the updated familiarity score of the one or more road segments is further based on a frequency of use of said one or more road segments.

9. A system for providing navigation instructions to a user for reaching a destination via a planned route on a map of a navigation system, said map comprising a plurality of road segments, at least a subset of said road segments comprising an assigned familiarity score, the system comprising:
    an input device configured to receive user input including the destination;
    a display device configured to display at least a portion of the planned route, wherein the planned route comprises one or more road segments;
    an audio device configured to output navigation instructions associated with the planned route; and
    a processor configured to:
        track the user's travel along the one or more road segments of the planned route;
        calculate an updated familiarity score of the one or more road segments of the planned route using an updating variable based on at least one dynamically obtained actual weather condition; and
        store the updated familiarity score in a data storage of the navigation system.

10. The system of claim 9, wherein the updated familiarity score of the one or more road segments is calculated further based on a user-defined updating variable, the user-defined updating variable being selected from a predetermined list of updating variables.

11. The system of claim 9, wherein the processor is further configured to:
    determine navigation instructions for the planned route, which comprises a set of road segments;
    select a subset of the navigation instructions based on the updated familiarity score of the set of road segments of the planned route; and
    present the selected subset of navigation instructions during navigation.

12. The system of claim 11, wherein the selected subset of the navigation instructions includes navigation instructions associated with a subset of the set of road segments, wherein the subset of road segments have respective familiarity scores below a predetermined threshold.

13. The system of claim 11, wherein the processor is further configured to replace the navigation instructions for the planned route with the selected subset of the navigation instructions.

14. The system of claim 9, wherein the processor is further configured to receive the actual weather condition from an external data source.

15. A computer program product for providing navigation instructions to a user for reaching a destination via a planned route on a map of a navigation system, said map comprising a plurality of road segments, at least a subset of said road segments comprising an assigned familiarity score, the computer program product comprising:
    a non-transitory computer readable storage medium having program code embodied therewith, the program code being executable by a processor, and the program code comprising instructions to:
        track the user's travel along one or more road segments of the planned route;
        calculate an updated familiarity score of the one or more road segments of the planned route using an updating variable based on at least one dynamically obtained actual weather condition; and
        store the updated familiarity score in a data storage of the navigation system.

16. The computer program product of claim 15, wherein the updated familiarity score of the one or more road segments is calculated further based on a user-defined updating variable, the user-defined updating variable being selected from a predetermined list of updating variables.

17. The computer program product of claim 15, wherein the program code further comprises instructions to:
    determine navigation instructions for the planned route, which comprises a set of road segments;

select a subset of the navigation instructions based on the updated familiarity score of the set of road segments of the planned route; and present the selected subset of navigation instructions during navigation.

18. The computer program product of claim 17, wherein the selected subset of the navigation instructions includes navigation instructions associated with a subset of the set of road segments, wherein the subset of road segments have respective familiarity scores below a predetermined threshold.

19. The computer program product of claim 17, wherein the program code further comprises instructions to replace the navigation instructions for the planned route with the selected subset of the navigation instructions.

20. The computer program product of claim 15, wherein the program code further comprises instructions to receive the actual weather condition from an external data source.

* * * * *